United States Patent
Lee

(10) Patent No.: US 6,381,690 B1
(45) Date of Patent: Apr. 30, 2002

(54) PROCESSOR FOR PERFORMING SUBWORD PERMUTATIONS AND COMBINATIONS

(75) Inventor: Ruby B. Lee, Los Altos Hills, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 1045 days.

(21) Appl. No.: 08/509,867

(22) Filed: Aug. 1, 1995

(51) Int. Cl.[7] .............................................. G06F 9/315
(52) U.S. Cl. ........................ 712/223; 345/522; 377/67
(58) Field of Search .............................. 377/69, 64, 66, 377/67; 364/259.5, 244.5; 345/520, 521, 522, 523, 524, 525, 526, 191, 513, 193, 198, 511; 395/885, 886, 564, 565, 562, 568, 573; 712/223

(56) References Cited

U.S. PATENT DOCUMENTS

| | | | |
|---|---|---|---|
| 3,810,112 A | * 5/1974 | Aho et al. | 365/230.09 |
| 4,085,447 A | * 4/1978 | Pertl et al. | 364/900 |
| 4,545,032 A | * 10/1985 | Mak | 364/900 |
| 4,567,572 A | * 1/1986 | Morris et al. | 364/900 |
| 4,816,817 A | * 3/1989 | Harrington | 345/198 |
| 4,937,574 A | * 6/1990 | Wright | 341/108 |
| 4,980,853 A | * 12/1990 | Hutchins | 364/900 |
| 5,027,318 A | * 6/1991 | Wischermann | 365/78 |
| 5,043,935 A | * 8/1991 | Taniai et al. | 395/886 |
| 5,107,415 A | * 4/1992 | Sato et al. | 395/800 |
| 5,268,858 A | * 12/1993 | Briggs | 395/565 |
| 5,390,135 A | * 2/1995 | Lee et al. | 364/749 |
| 5,471,628 A | * 11/1995 | Phillips et al. | 395/564 |
| 5,524,256 A | * 6/1996 | Turkowski | 395/898 |
| 5,631,927 A | * 5/1997 | Caia et al. | 375/260 |

FOREIGN PATENT DOCUMENTS

| | | | |
|---|---|---|---|
| EP | A 0264 130 | 10/1987 | G06F/5/00 |
| EP | A 0 292 943 | 5/1988 | G06F/7/00 |

OTHER PUBLICATIONS

Robert Y. Hou, Jai Menon, Yale N. Patt (IEEE 1993) Balancing I/O Response Time and Disk Rebuild Time in a RAID 5 Disk Array.*

IBM Technical Disclosure Bulletin, "Bit Manipulator", vol. 17, No. 6, Nov. 1974, New York, NY, USA, pp. 1575,1576.

* cited by examiner

Primary Examiner—Dung C. Dinh

(57) ABSTRACT

An apparatus for operating on the contents of an input register to generate the contents of an output register which contains a permutation, with or without repetitions, or a combination of the contents of the input register. The apparatus partitions the input register into a plurality of sub-words, each sub-word being characterized by a location in the input register and a length greater than one bit. In response to an instruction specifying a rearrangement of the input register, the present invention directs at least one of the sub-words in the input register to a location in the output register that differs from the location occupied by the sub-word in the input register. The ordering of the sub-words in the output register differ from the order obtainable by a single shift instruction. In the preferred embodiment of the present invention, the invention is implemented by modifying a conventional shifter comprising a plurality of layers of multiplexers. The modification comprises independently setting the control signals for at least one of the multiplexers in at least one of the layers.

8 Claims, 3 Drawing Sheets

PROCESSOR FOR PERFORMING SUBWORD PERMUTATIONS AND COMBINATIONS

FIELD OF THE INVENTION

The present invention relates to computers, and more particularly, to shifter units for use therein.

BACKGROUND OF THE INVENTION

Computer processors are typically optimized for a particular word size. For example, processors optimized for 32 or 64 bits are commercially available. Processor registers and data paths are likewise designed to efficiently process operands that are as wide as the design word width. While narrower operands can be processed in the same registers and data path, they use the data path less efficiently.

The precision of the data for a large class of applications is often less than the word size in bits of the computers on which the data is manipulated. In such systems, it is advantageous to pack multiple data entries into a single word. This reduces the storage needed for the data and, reduces memory access time, since memory is normally accessed in units of words. Much of this advantage is, however, lost if one must rearrange the items in a word, as the additional processing time may be longer than the memory access times that would be incurred if the data were not packed into words.

For example, image applications often involve a large number of small data words. For example, black and white images are often represented as arrays of pixel values in which each pixel is an 8-bit integer representing the intensity of one point in the image. A 1000×1000 pixel image requires 1 million bytes of storage. To provide efficient storage and movement of image data, the data is often packed into larger words. For example, in a computer system optimized for 64 bit data words, 8 pixel values may be packed into each 64-bit word. This allows 8 pixels to be moved from memory in a single memory cycle, as well as reducing the number of memory words needed for storing the image. Unfortunately, when computations are to be performed on individual pixel values, some form of unpacking operation must be utilized to isolate the individual value from the remaining pixel values.

In general, a conventional computer processor takes two operands. The operands are usually stored in two registers. The processor performs a transformation on these operands specified by an instruction and then writes the results back to another register. If multiple operands are packed into a register, it is often desirable to be able to rearrange, or permute, these operands within the register. In prior art systems, such rearrangements are time-consuming since the processors are optimized to treat the contents of a register as a basic unit. In general, a specified field in a register may be extracted only by a series of shifting and masking operations. For example, a general permutation of 4 data items in a register typically requires a significant number of instructions on most general-purpose processors.

Broadly, it is the object of the present invention to provide an improved functional unit.

It is a further object of the present invention to provide a functional unit that can generate any permutation, with or without repetitions, of the sub-fields of a data word in a single instruction.

These and other objects of the present invention will become apparent to those skilled in the art from the following detailed description of the invention and the accompanying drawings.

SUMMARY OF THE INVENTION

The present invention is an apparatus for operating on the contents of an input register to generate the contents of an output register which contains a permutation of the contents of the input register. The apparatus partitions the input register into a plurality of sub-words, each sub-word being characterized by a location in the input register and a length greater than one bit. In response to an instruction specifying a rearrangement of the input register, the present invention directs at least one of the sub-words in the input register to a location in the output register that differs from the location occupied by the sub-word in the input register. The ordering of the sub-words in the output register differ from the order obtainable by a single shift instruction. In the preferred embodiment of the present invention, the invention is implemented by modifying a conventional shifter comprising a plurality of layers of multiplexers. The modification comprises independently setting the control signals for at least one of the multiplexers in at least one of the layers.

DETAILED DESCRIPTION OF THE INVENTION

Figure 1:
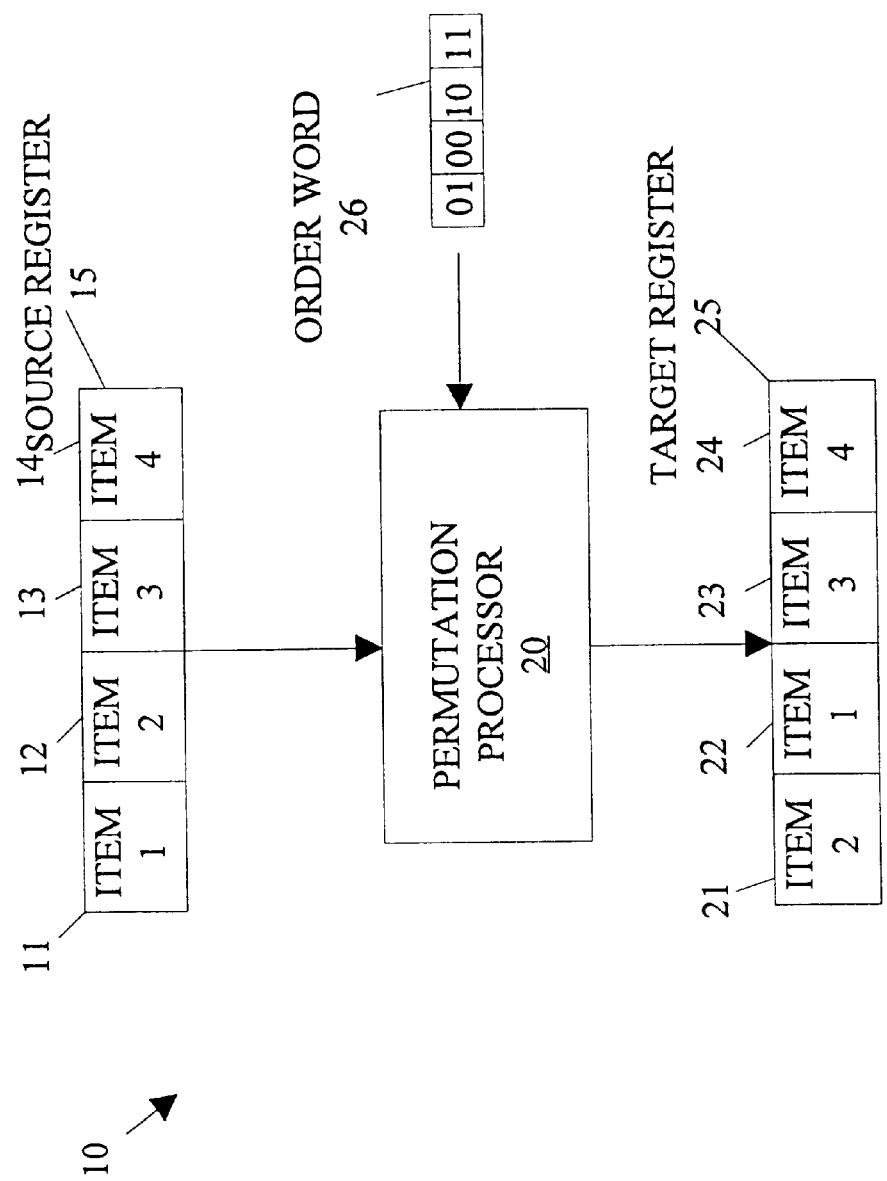
FIG. 1 is a block diagram of a permutation processor 20 according to the present invention.

The manner in which the present invention operates may be more easily understood with reference to FIG. 1 which is a block diagram of a permutation processor 20 according to the present invention. In general, processor 20 operates on the contents of a source register 15 having a number of packed data items. In the example shown in FIG. 1, there are 4 items packed into each register. The items in source register 15 are shown at 11–14. Permutation processor 20 accepts an order word 26 which specifies the manner in which the data items in source register 15 are to be re-arranged to generate the data items in the target register 25. In the preferred embodiment of the present invention, permutation processor 20 accepts an instruction specifying the target register, order word, and source register.

Permutation processor 20 supports both permutations with repetitions and permutations without repetitions. In a permutation without repetition, the data items in the source register are re-ordered in the target register; however, no item is duplicated or eliminated. The rearrangement shown in FIG. 1 is an example of a permutation without repetitions. In a permutation with repetitions, any data item may be duplicated or eliminated. Suppose source register 15 contains the data elements "abcd". A permutation without repetition of source register 15 would be "bcad". An exemplary permutation with repetition would be "cbbd". Permutations with repetitions are specific instances of "combinations". In a combination, the number of repetitions of each element is all that is important. That is, the ordering of each element is not important. For example, "aabb" and "abab" are the same combination, but different permutations with repetitions. The term permutation as used herein denotes both permutations, with and without repetitions, and combinations unless the context indicates otherwise.

In one embodiment of the present invention, the order word is a list of the items in the target register in the order that the items are to appear in the target register. The number of bits in the order word depends on the maximum number of data items that can be packed into each register. In the example shown in FIG. 1, the source and target registers have 4 data items each. To specify a data item that is one of four possible data items requires two bits. Hence, in this example, the order word requires 8 bits which are organized as four two-bit sub-words. The items in the source register are labeled from 0 to n-1. The order word for the permutation shown in FIG. 1 is shown at 26. Similarly, a combination rearrangement in which "abcd"→"cbbd" would be represented by an order word of (10 01 01 11).

In this embodiment of the present invention, permutation processor 20 is implemented by utilizing a modification of a shifter that is present in the integer data path of almost all general-purpose computers. In the preferred embodiment of the present invention, the shifter is built from a plurality of stages of multiplexers. In a conventional shifter, each stage of multiplexers has the same control bits. The preferred embodiment of the present invention requires only that independent controls be established for each multiplexer in at least one of these stages.

However, before describing the preferred embodiment of the present invention which utilizes the above-described modification of a conventional shifter, a somewhat simpler embodiment of the present invention will be described with reference to FIG. 2 which is a block diagram of an implementation of a permutation processor according to the present invention. This embodiment of the present invention is implemented with the aid of a single layer of multiplexers 45. In this embodiment of the present invention, each sub-word in source register 55 is connected to each possible sub-word in target register 65 by a corresponding multiplexer. The source register sub-words are shown at 51–54, and the target registers are shown at 61–64. In this embodiment of the present invention, the multiplexers are associated with the target register sub-words, the multiplexers associated with target sub-words 61–64 being shown at 41–44, respectively. Each multiplexer is controlled by a different sub-word of an order register 75 which holds the order word described above. Each multiplexer moves a sub-word. Hence, if the sub-words are 8-bits in length, each multiplexer is an 8-bit wide multiplexer.

Figure 2:
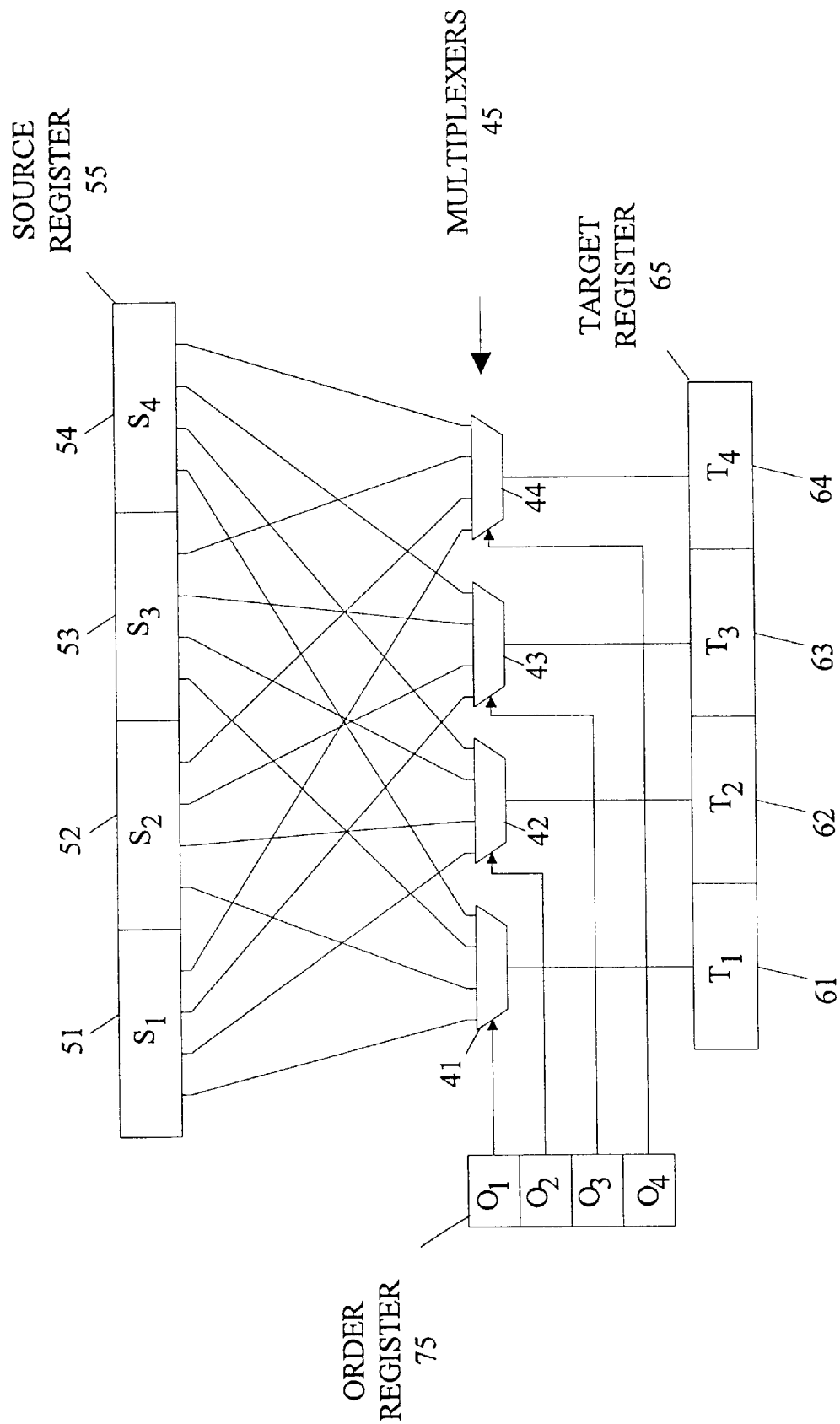
FIG. 2 is a block diagram of an implementation of a permutation and combination processor according to the present invention which is implemented with the aid of a single layer of multiplexers.

While the embodiment shown in FIG. 2 is relatively simple, its implementation on a conventional general purpose computer requires that additional hardware be added to the processing unit of the general purpose computer. As noted above, the preferred embodiment of the present invention achieves further advantages over the embodiment shown in FIG. 2 by sharing the multiplexers that are already present in a conventional shifter, thereby eliminating the need to add additional multiplexers to the conventional computer design.

Figure 3:
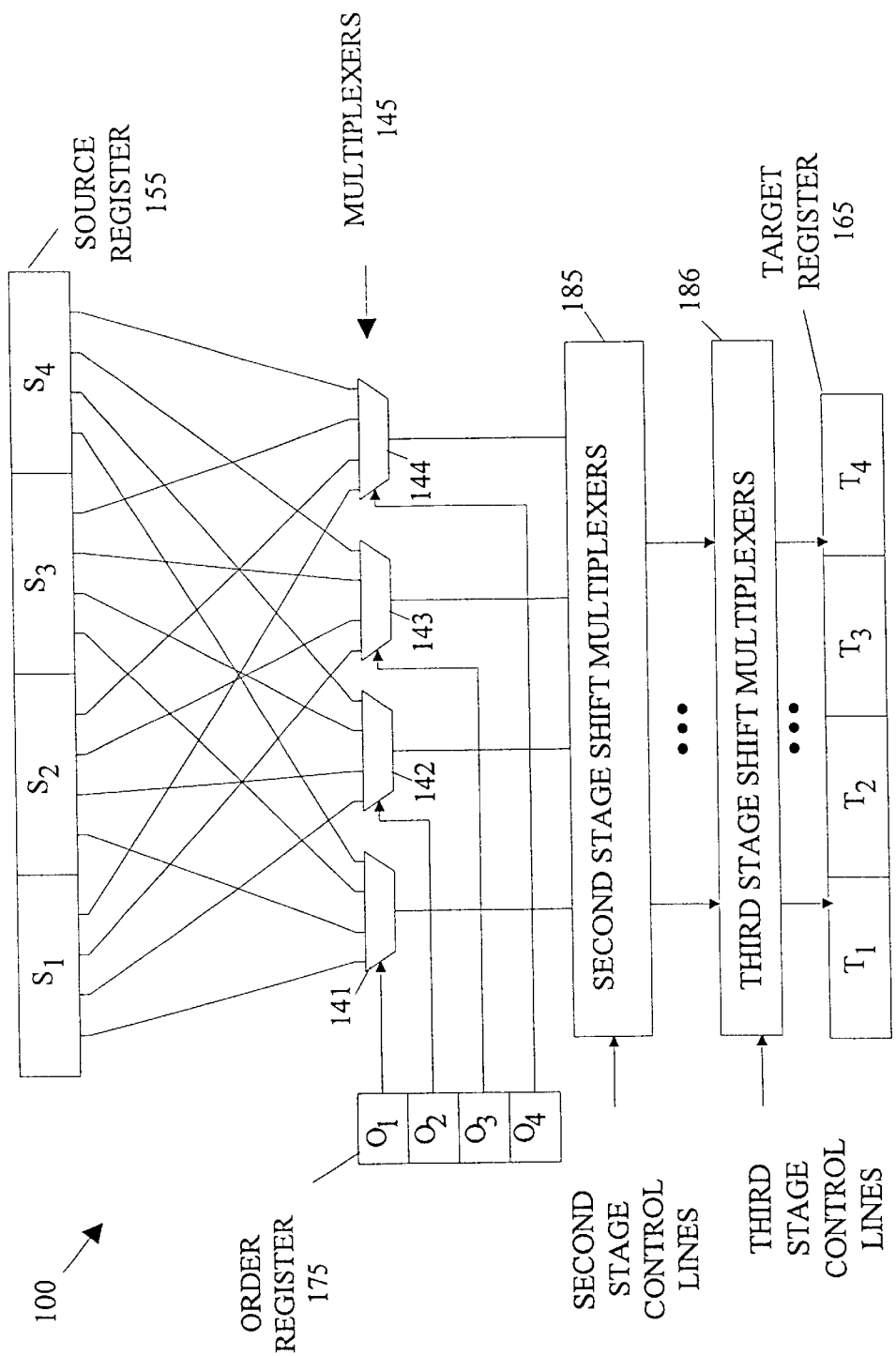
FIG. 3 is a block diagram of a portion of a conventional shifter that has been modified to provide an embodiment of the present invention.

To simplify the following discussion, a particular word size will be utilized; however, it will be apparent to those skilled in the art that other word sizes may be implemented using the teachings of this example. Consider a computer that utilizes 64-bit words. A conventional shifter in such a computer can be implemented in 3 stages of 4:1 multiplexers as shown in FIG. 3 at 100. The first stage shifts the input by a multiple of 16 bits, i.e., 0, 16, 32 or 48 bits. The second stage 185 shifts the input to that stage by multiples of 4 bits, i.e., 0, 4, 8, or 12 bits. The final stage 186 shifts the input by 0 to 3 bits in one bit increments. If the shifter is implemented as a 0 to 64 bit shift, the final stage shifts the input right by up to 4 bits. However, for simplicity, the following discussion will assume a 0 to 63 bit shift range.

The first stage of shifter 100 is exactly the same as the simple embodiment of the present invention shown in FIG. 2 for the case in which 16-bit subwords are to be used in the permutation provided the conventional control lines are altered such that the multiplexer controls can be set to values that are determined by the contents of an order register. Such an arrangement is shown in FIG. 3, the first stage multiplexers 141–144 are controlled by the contents of order register 175. When used as a permutation generator, the control lines of second and third stage multiplexers are set to zero. When used as a shifter, the order register is set to provide the same input to each of the first stage multiplexers, and the control lines of the second and third stages of multiplexers, shown at 185 and 186, are set in the conventional manner.

In the above discussion, it was assumed that the source register 155 and target register 165 were to divided into no smaller than 16-bit subwords for the purpose of performing permutations. If smaller sub-words are needed and the full set of permutations are to be generated, then the preferred embodiment of the present invention utilizes a different embodiment of the shifter in which the shifter is re-designed such that the first stage of multiplexers can provide the permutations. For example, if 8-bit subwords are to be used, then the 64-bit shifter described above can be implemented as two stages of 8:1 multiplexers. The first stage would then be capable of generating the full set of permutations.

If less than the full set of permutations is to be generated, then a design in which the second stage and/or third stage multiplexers are also utilized may be possible depending on the subset of permutations desired. In this design, the control lines of the multiplexers of the second, and/or, third stages are set such that, for at least one permutation in the set of allowable permutations, at least one of the multiplexers in these stages receives a different control signal than the other multiplexers in that stage.

There are a number of permutations that are particularly useful in implementing mathematical computations that are often carried out as part of computer programs. These are summarized in Table I, below. For the purposes of illustration, it is assumed that the source register is divided into 8 subwords denoted by "abcdefgh".

TABLE I

Special Permutations

| Output Sequence | Permutation |
|---|---|
| hgfedcba | reverse permutation |
| aebfcgdh | shuffle permutation |
| aecgbfdh | mix permutation |
| acegbdfh | alternate permutation |
| hhhhhhhh | broadcast high permutation |
| aaaaaaaa | broadcast low permutation |
| badcfehg | exchange permutation |

Table I

Special Permutations

The shuffle and mix permutations treat the input register as two 4-subword registers. The output register is assembled by alternately taking one sub-word from the first register and one from the second register. The alternate permutation moves every other subword to the output register and then moves the remaining subwords. The broadcast permutations repeat the same subword in all positions of the output register. While the above table lists only two of the possible broadcast permutations, It will be apparent to those skilled in the art that broadcast permutations may be implemented based on any subword in the input register. Finally, the exchange permutation reverses the order of each pair of subwords.

It will be apparent to those skilled in the art that other specialized permutations may be advantageously incorporated in the present invention. For example, conditional exchange permutations in which subwords are conditionally re-ordered depending on the value of a bit corresponding to each pair of subwords in the portion of the instruction that specifies the permutation may be implemented. This implementation allows any of 16 specific different permutations of 8 subwords to be specified with only 4 bits. The 16 permutations in question and the corresponding 4 bits are shown in Table II

TABLE II

Conditional Exchange Permutations

| Conditional Exchange | 4-bit Specification |
| --- | --- |
| abcdefgh | 0000 |
| abcdefhg | 0001 |
| abcdfegh | 0010 |
| abcdfehg | 0011 |
| abdcefgh | 0100 |
| abdcefhg | 0101 |
| abdcfegh | 0110 |
| abdcfehg | 0111 |
| bacdefgh | 1000 |
| bacdefhg | 1001 |
| bacdfegh | 1010 |
| bacdfehg | 1011 |
| badcefgh | 1100 |
| badcefhg | 1101 |
| badcfegh | 1110 |
| badcfehg | 1111 |

Conditional Exchange Permutations

While the above described embodiments of the present invention utilize an order word that is contained in the instruction, embodiments in which the order word is indirectly specified are also possible. Such embodiments are useful in cases in which the number of subwords is sufficiently large to preclude including the corresponding order word in an instruction because the length of order word would exceed the allowable length of an instruction. In such embodiments, the order word may reside in one or more registers whose identity is specified in the instruction. The order word can also reside in memory at an address specified in the instruction. Finally, the order word can reside at a predetermined location. In this case, the instruction implicitly specifies the location of the order word.

In embodiments in which the full set of permutations is not implemented, the implemented permutations may be numbered. The instruction, or register pointed to by the instruction, would then contain the number of the permutation. An appropriate mapping table would then be used to convert the permutation number into the equivalent order word.

While the above described embodiments have been described in terms of an order word that is stored in a register, embodiments in which the order word does not actually reside in a register are also possible. In such embodiments, the bits of the order word are generated on the appropriate control lines of the multiplexers directly. For example, in the embodiments in which a subset of permutations is implemented, the mapping circuitry that translates the permutation number need only generate the corresponding logic signals for application to the multiplexers used to implement the permutation. In these embodiments, the "order word" exists only as a set of logic levels on the appropriate signal lines.

While the above description has emphasized permutations in which at least one of the subwords in the output register is different from the corresponding subword in the input register, it will be apparent to those skilled in the art that the present invention also supports the identity permutation in which the input and output registers are identical.

Various modifications to the present invention will become apparent to those skilled in the art from the foregoing description and accompanying drawings. Accordingly, the present invention is to be limited solely by the scope of the following claims.

What is claimed is:

1. An apparatus for generating permutations of an input data word, said apparatus comprising:

an input register for holding said input data word;

means for partitioning said input register into a plurality of sub-words, each said sub-word being characterized by a location in said input register and a length greater than one bit;

an output register for holding said permutations of said input data word, said output register being different from said input register; and means, responsive to an instruction, for directing at least one of said sub-words to a location in said output register that differs from said location occupied by said sub-word in said input register, said location being specified by said instruction, the ordering of said sub-words in said output register differing from the order obtainable by a single shift or rotation of the contents of said input register or by a rotation of the contents of said input register with one path from said input register to said output register being disabled, the ordering of said sub-words in said output register being independent of the contents of said sub-words.

2. The apparatus of claim 1 wherein at least one of said sub-words in said input register appears more than once in said output register.

3. The apparatus of claim 1 wherein said instruction comprises a bit pattern specifying the contents of said output register.

4. The apparatus of claim 1 wherein said contents of said output register are specified by a word identified by said instruction.

5. The apparatus of claim 1 wherein said contents of said output register are specified by a value in said instruction, said value specifying the identity of a permutation in a predetermined set of permutations.

6. The apparatus of claim 5 wherein one of said permutations in said set of permutations is chosen from the group consisting of reverse, shuffle, mix, alternate, broadcast, exchange, and conditional exchange permutations.

7. The apparatus of claim 1 wherein said directing means comprises a plurality of multiplexers for connecting a sub-word in said input register to any one of a plurality of sub-words in said output register.

8. In a data processing system having an apparatus for shifting the contents of an input register to generate the contents of an output register, said apparatus comprising an ordered plurality of stages of multiplexers, including a first stage, a last stage, and, optionally, one or more intermediate stages, said first stage of multiplexers having as inputs thereto the contents of said input register and said last stage of multiplexers having as outputs therefrom said contents of said output register, said intermediate stage or stages, if any, having inputs connected to the output of said multiplexers in the previous stage of said stages of multiplexers, each said multiplexer being controllable by control lines specifying connections between the inputs and outputs thereof, wherein all of said multiplexers in each of said stages receive the same control signals on said control lines when said apparatus performs a shifting operation, the improvement comprising means for independently controlling said control lines of at least one stage of said multiplexers in response to an instruction specifying a permutation of the contents of said input register thereby providing control signals to at least one multiplexer in said stage that differ from said control signals provided to another multiplexer in said stage, the ordering of said sub-words in said output register being independent of the contents of said sub-words.

* * * * *